(12) United States Patent
Bauder

(10) Patent No.: US 7,694,870 B2
(45) Date of Patent: Apr. 13, 2010

(54) METHOD FOR THE PRODUCTION OF A STRIP COMPRISING A STAGGERED PROFILE THAT RUNS IN THE LONGITUDINAL DIRECTION THEREOF

(76) Inventor: Hans-Jörg Bauder, Hauptmannstrasse 35, D-75417 Mühlacker (DE)

( * ) Notice: Subject to any disclaimer, the term of this patent is extended or adjusted under 35 U.S.C. 154(b) by 901 days.

(21) Appl. No.: 10/537,683

(22) PCT Filed: Dec. 5, 2003

(86) PCT No.: PCT/EP03/13786

§ 371 (c)(1),
(2), (4) Date: Apr. 7, 2006

(87) PCT Pub. No.: WO2004/052584

PCT Pub. Date: Jun. 24, 2004

(65) Prior Publication Data

US 2006/0186178 A1     Aug. 24, 2006

(30) Foreign Application Priority Data

Dec. 6, 2002   (DE)   ................... 102 58 824

(51) Int. Cl.
  *B23K 20/04*   (2006.01)
(52) U.S. Cl. .................. 228/235.2; 228/117
(58) Field of Classification Search ............... 228/117, 228/158, 159–161, 163, 235.2, 235.3; 29/17.3, 29/81.03, 426.4, 557
See application file for complete search history.

(56) References Cited

U.S. PATENT DOCUMENTS

| | | | | |
|---|---|---|---|---|
| 3,711,937 A | * | 1/1973 | Emley | 228/206 |
| 3,835,681 A | * | 9/1974 | Shumaker | 72/11.5 |
| 3,850,729 A | * | 11/1974 | Paulson et al. | 156/390 |
| 3,938,723 A | * | 2/1976 | Slaughter | 228/117 |
| 4,248,921 A | * | 2/1981 | Steigerwald et al. | 428/148 |

(Continued)

FOREIGN PATENT DOCUMENTS

DE    1527534    3/1965

(Continued)

OTHER PUBLICATIONS

JPO machine translation of JP-10128424, abstract, published May 19, 1998.*

(Continued)

*Primary Examiner*—Jessica L. Ward
*Assistant Examiner*—Kevin E Yoon

(57) ABSTRACT

A method for producing a strip with width of two longitudinal edges, made of at least one first metallic or predominantly metallic material, and the region, across which the first material extends, is provided with a boundary area that extends in staggered manner between two longitudinal edges over the cross-section of the strip. The invention comprises the steps of a) combing strips of different widths, which contain the first material and which as such do not comprise a staggered boundary area between their two longitudinal edges, to form a first arrangement of strips having a staggered boundary area; b) complementing the first arrangement of strips by one or more additional strips to form a second arrangement of strips having a rectangular cross-section, and c) bonding at least the strips of the first arrangement of strips to each other by rolling.

48 Claims, 9 Drawing Sheets

U.S. PATENT DOCUMENTS

| | | | | |
|---|---|---|---|---|
| 4,354,301 A | * | 10/1982 | Takeuchi et al. | 29/896.41 |
| 4,423,120 A | * | 12/1983 | Paulus et al. | 428/614 |
| 4,782,994 A | * | 11/1988 | Raybould et al. | 228/235.3 |
| 4,798,932 A | * | 1/1989 | Dion et al. | 228/235.3 |
| 5,042,711 A | * | 8/1991 | Iskenderian et al. | 228/235.2 |
| 5,086,967 A | * | 2/1992 | Delalle et al. | 228/56.3 |
| 6,189,770 B1 | * | 2/2001 | Lotz | 228/235.2 |

FOREIGN PATENT DOCUMENTS

| | | |
|---|---|---|
| DE | 2937317 | 9/1979 |
| GB | 2237227 | 9/1990 |
| JP | 10128424 A * | 5/1998 |

OTHER PUBLICATIONS

Patent Abstracts of Japan, JP 61092790, Dec. 10, 1984, Nayama Risuke.
Patent Abstracts of Japan, JP 11077336, Dec. 9, 1997, Fakuda Hiroshi.
Patent Abstracts of Japan, JP 61001487, Jun. 14, 1984, Mori Katsuichi.
Patent Abstracts of Japan, JP 55040011 A, Sep. 9, 1978, Baba Hidekazu.
Patent Abstracts of Japan, JP 61017308 A, Mar. 7, 1984, Katsishima Koji.

* cited by examiner

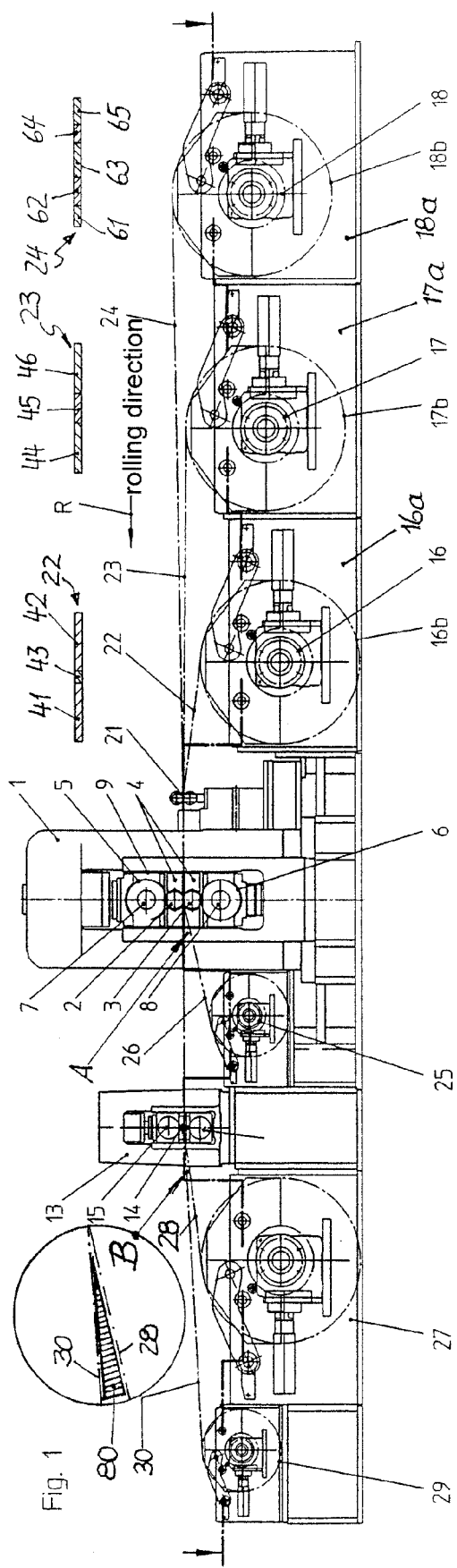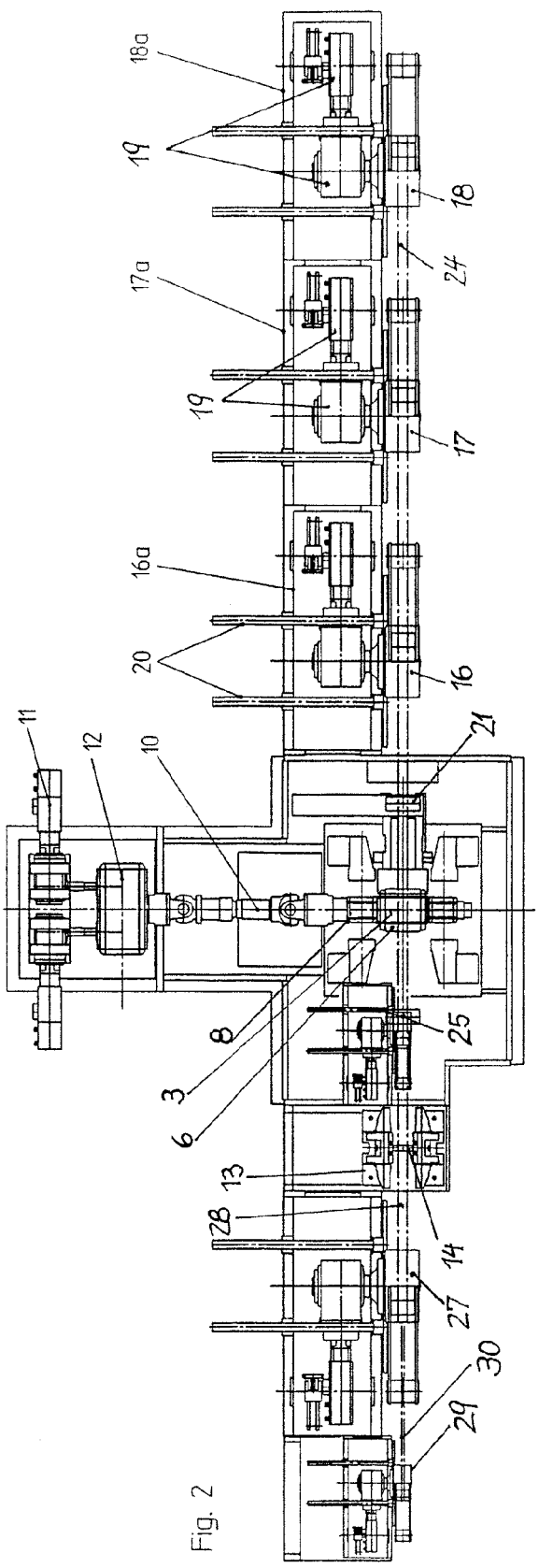

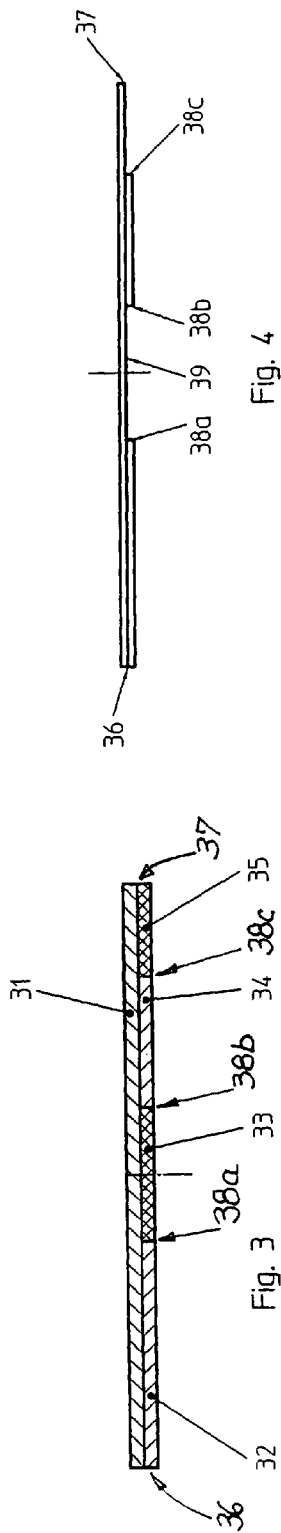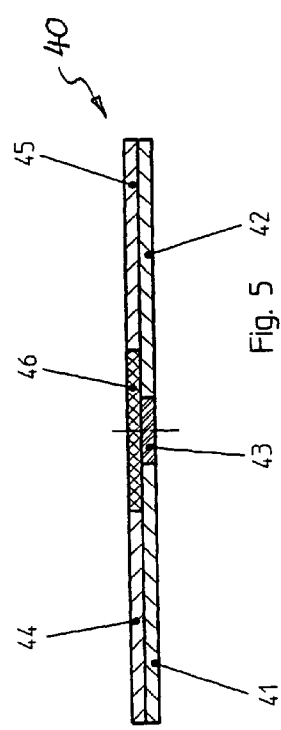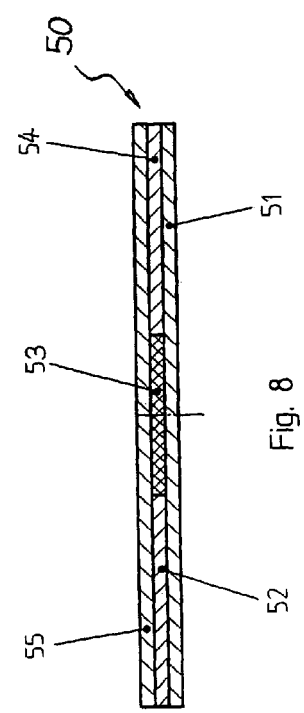

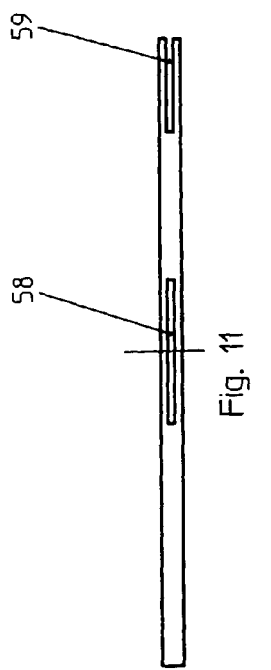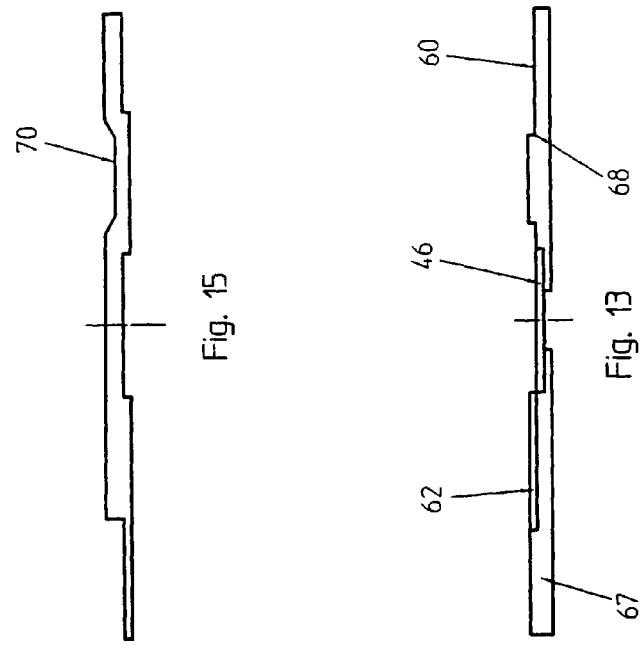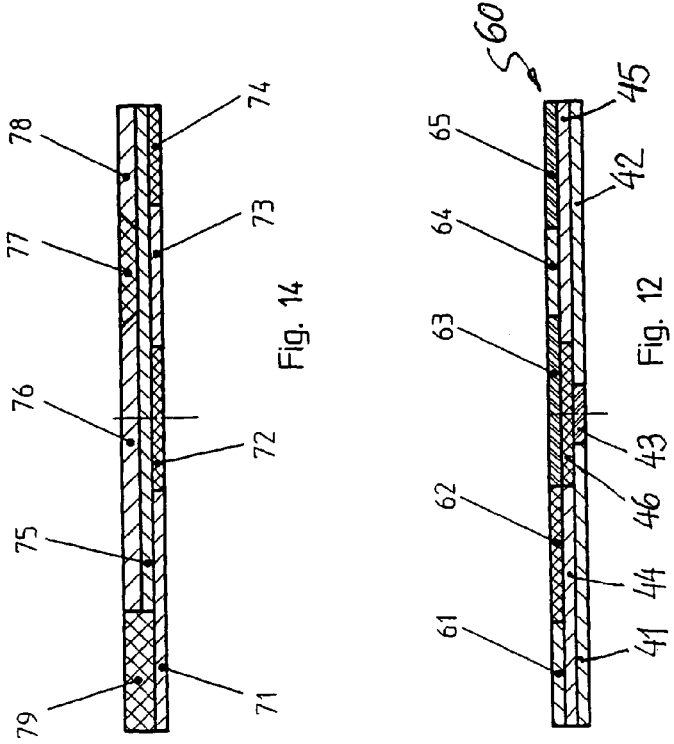

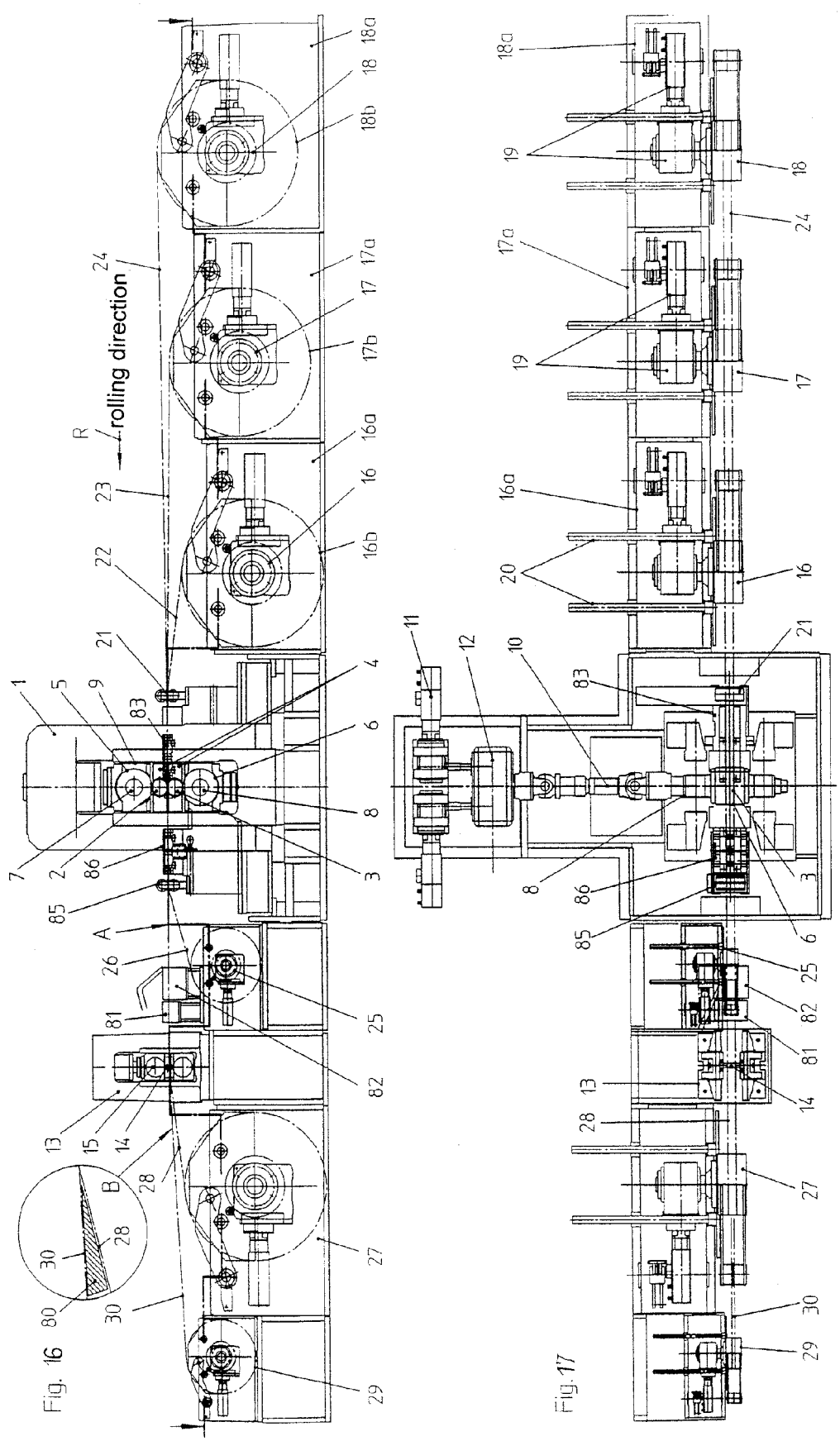

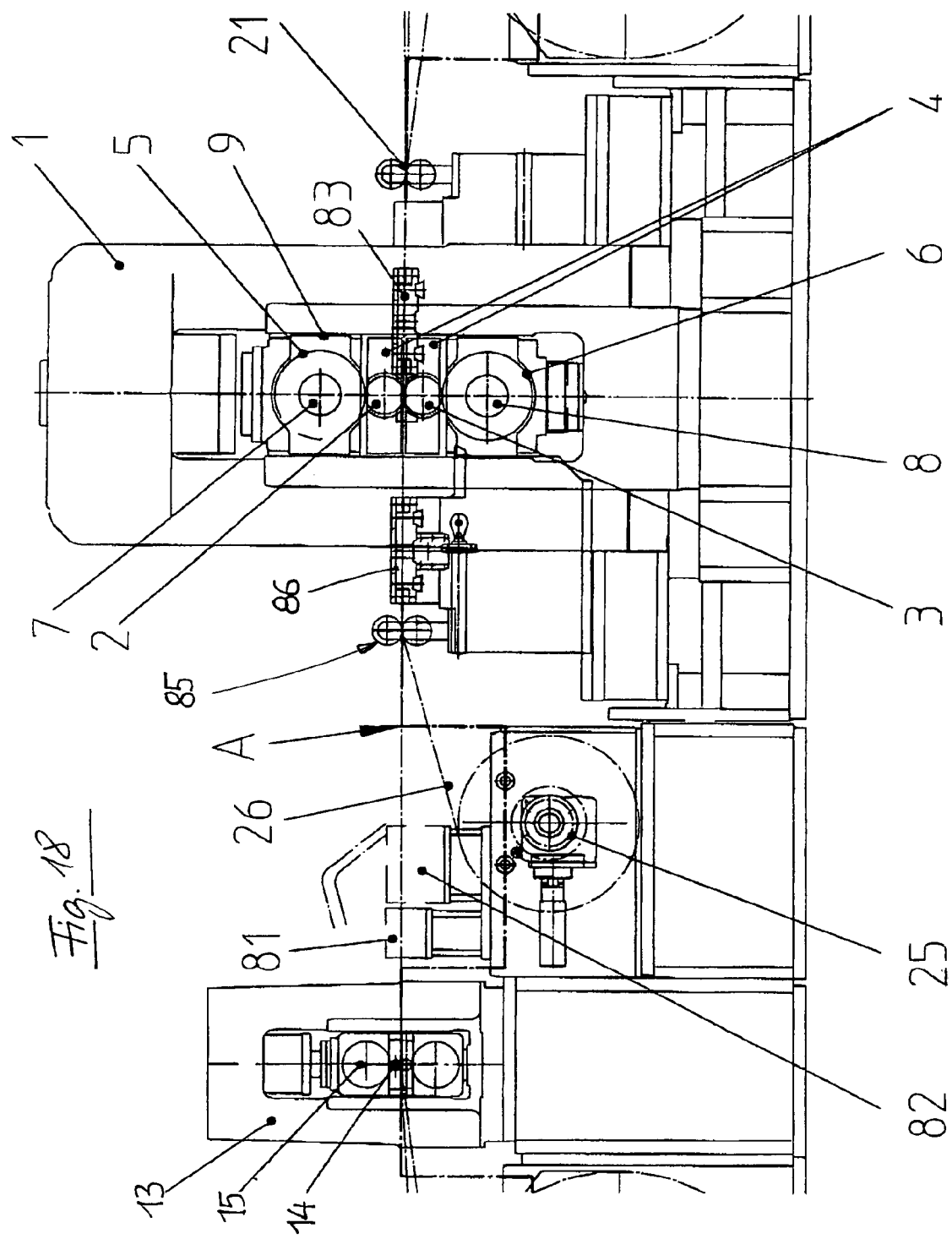

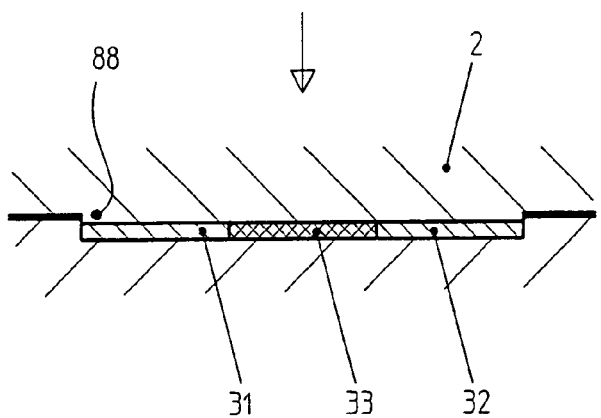
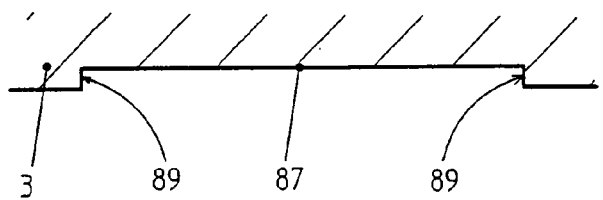
Fig. 20

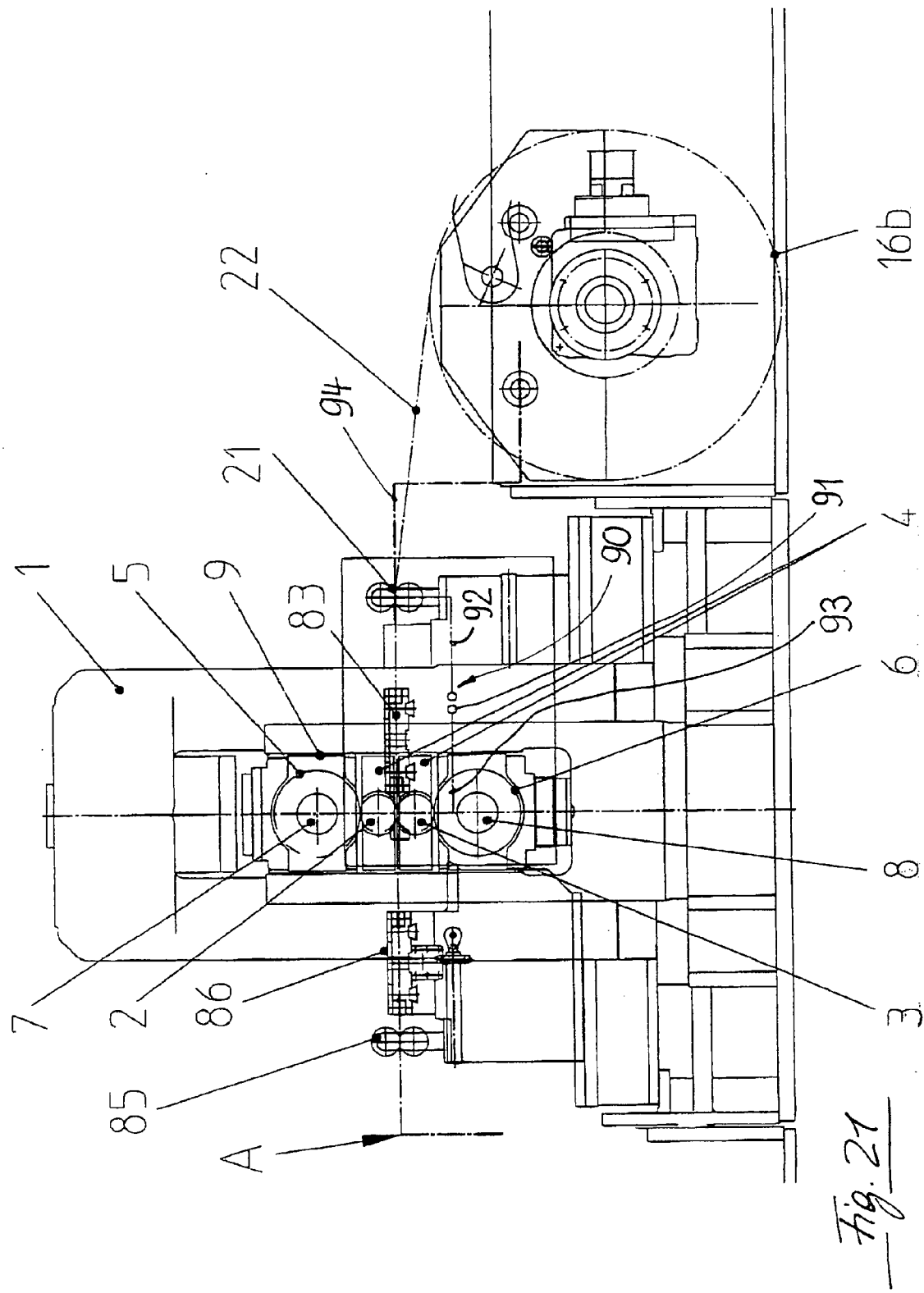

METHOD FOR THE PRODUCTION OF A STRIP COMPRISING A STAGGERED PROFILE THAT RUNS IN THE LONGITUDINAL DIRECTION THEREOF

BACKGROUND OF THE INVENTION

1. Field of the Invention

The present invention relates to a method for producing a strip the width of which is defined by the two longitudinal edges thereof, which is made of at least one first metallic or predominantly metallic material, and in which the region, across which the first material extends, is provided with a boundary area that extends in staggered manner between the two longitudinal edges over the cross-section of the strip, as defined in the preamble of Claim 1. Strips of that kind are known, for example, in the form of bimetal strips where a carrier strip, consisting of a first metal, comprises a longitudinal groove filled with a strip of a second material. Such an arrangement is described as strip plating or inlay plating. Further, there have been known metal strips where a carrier strip consisting of a first metal is stepped along one of its longitudinal edges and the step is filled with a strip consisting of a second material. Such an arrangement is described as front edge plating. Further, there have been known strips that comprise both an inlay plating and a front edge plating. It has been known to produce plated strips of that kind by starting out from a carrier strip of flat rectangular cross-section, forming in that carrier strip the required number of grooves and/or steps by cutting operations (milling, stripping or scraping, with milling being preferred) and replacing the material removed by the machining operation by a corresponding number of strips consisting of one or more other metals or alloys. Connecting the carrier strip with the fitted strips is then effected by cold-roll plating or hot-roll plating, during which process the length of the strip increases as a function of the selected reduction per pass of the rolling operation.

2. Description of the Related Art

Variations in dimension in the region of an inlay plating and a front edge plating are determined essentially by the variation in dimensions resulting from the respective cutting operation. Variations in dimension resulting from the respective cutting operation occur in the same order of magnitude in the roll-plated strip. The same applies correspondingly to the production of strips provided with one or more longitudinal grooves or steps that are not filled with another metal by roll plating.

Variations in dimension are considered as a problem especially in strip-shaped semi-finished products for electric laboratory resistors. It has been known to produce such a strip-shaped semi-finished products by placing a strip consisting of the resistor material, for example of the alloy manganine, on two copper strips, arranged at a spacing in parallel one to the other, so that the first-mentioned strip bridges the space between the two copper strips. The strips arranged in this manner are then bonded either by roll seam welding or by electron beam welding. Apart from the fact that such a production method is relatively costly, variations with respect to the spacing of the copper strips, and variations with respect to the dimension and quality of the welding seams may lead to undesirable fluctuations in resistance of the laboratory resistors produced from the semi-finished strip material by punching. Further, it is an undesirable effect of that process that the laboratory resistors present a step between the manganine and the copper on the side on which the manganine strip is welded onto the copper strips. Such a step could be avoided by milling a step into the two copper strips, along one of their edges, that corresponds in height to the thickness of the manganine strip and which is then filled up again by fitting the manganine strip. The manganine strip placed on the two steps of the copper strips can then be bonded to the latter by roll seam welding or electron seam welding. The undesirable step between the manganine surface and the copper surface could be removed in this way—though at the high price of two milling operations and without reducing the fluctuation of the resistance values.

From JP 550 400 11 A it has been known to produce plates with grooves by placing wires, consisting of a hard material, on a sheet consisting of a softer material, and by then subjecting the assembly to a subsequent rolling operation. The wires thereby dig into the sheet and can then be removed again.

From JP 610 173 08 A it has been known to place two metal strips one on top of the other and to bond them together by rolling.

GB 2 237 227 A describes a method where a plurality of metal plates are placed one on top of the other, are subjected to a rolling operation, and are then wound up separately.

DETAILED DESCRIPTION OF THE INVENTION

Now, it is the object of the present invention to open up a way of producing strips or strip-like semi-finished products of the above-mentioned kind with greater precision, but without increasing the production costs, if possible.

This object is achieved by a method having the features defined in Claim 1, and by a method having the features defined in Claim 44. Advantageous further developments of the invention form the subject-matter of the sub-claims.

According to the invention, strips, which are composed of at least one first metallic or predominantly metallic material, where the region of the strip across which the first material extends comprises a boundary area that extends in staggered manner between the two longitudinal edges of the strips, over the cross-section of the strip, are produced by the steps of [0010] (a) combining strips of different widths, which contain the first material and which as such do not comprise a staggered boundary area between their two longitudinal edges, to form a first arrangement of strips having a staggered boundary area; [0011] (b) complementing the first arrangement of strips by one or more additional strips to form a second arrangement of strips having a rectangular cross-section; and [0012] (c) bonding at least the strips of the first arrangement of strips to each other by rolling.

In the context of the invention, the term metallic materials means pure metals, alloys and metallic mixtures; the term predominantly metallic materials means materials where more than 50 percent by weight consist of one or more metals and the rest consists of one or more non-metals and/or chemical compounds, especially metal oxides such as tin oxide or copper oxide, metal nitrides, metal carbides or metal metalloids, such as carbon or graphite.

The term strips of rectangular cross-section means strips where the top and the bottom surfaces extend in parallel to each other so that the top and the bottom are represented in cross-section by two parallel straight lines of equal length, the flanks connecting the top and the bottom of a strip consisting predominantly of cutting edges or edges formed by extrusion, which may have been reduced in height by subsequent rolling operations and may present irregularities typical for the production methods of the preceding production steps, so that the strip presents deviations from the ideal rectangular cross-sectional shape typical for the respective production methods.

The before-mentioned "staggered boundary area" may be a boundary area comprising one or more stair-like steps of the kind found in front edge platings, and the steps need not necessarily exhibit a rectangular shape, but may have an obtuse-angle or acute-angle or even an undercut shape. For forming an acute-angle or obtuse-angle step one then uses strips which have one flank extending at an acute or at an obtuse angle, which strips can be produced for example by extrusion if a corresponding die cross-section with one or two inclined flanks is used. Thus, staggered boundary areas are found not only in strips with a staggered profile, but also in grooved strips and hollow-section strips.

The invention offers considerable advantages: [0017] Strips in which a first material comprises a boundary area that extends in staggered manner between the two longitudinal edges of the strip can be produced without a milling operation or any other cutting operation, and need not be subjected to a roll-seam welding process or an electron beam process or any other welding or soldering operation. The strips according to the invention can be produced by a single rolling operation, preferably supplemented by a heat treatment.

As there is no need for cutting operations, and as one can do even without any welding or soldering operations, the method according to the invention is extraordinarily advantageous in terms of costs. [0019] Given the fact that the strips according to the invention can be produced solely by a rolling operation, if desired supplemented by a heat-treatment, it is possible to achieve deviations in dimension smaller by approximately the factor 10 than the deviations in dimension achievable according to the prior art. [0020] Strips can be produced with high surface quality. There have already been reached peak-to-valley values smaller than R.sub.a=0.02, whereas the peak-to-valley values achievable by milling operations are at best equal to R.sub.a=0.2. [0021] Due to the higher quality, practically no waste is produced. [0022] However, the smaller variations in dimension are not achieved at the cost of higher production costs, but even lead to reduced production cost. [0023] Disruptions in structure, as produced by milling and cutting operations, are avoided by the invention. [0024] Unlike the case where strips are connected by roll-seam welding or electron beam welding, a full-surface bond is achieved by the roll plating process. [0025] Energy consumption is reduced as compared with the prior art. [0026] As no cutting operation is involved, no chips or oil are produced that need to be treated. Accordingly, the invention is environmentally more compatible than the prior art. [0027] The Method according to the invention allows an extraordinary variety of strips and strip-like semi-finished products to be produced from one or more different materials:

For example, a strip comprising a strip-shaped inlay plating can be produced from four separate strips of rectangular cross-section, where a first strip, consisting of a first material has the width of the strip to be produced, whereas a second strip, consisting of the first material, a third strip, consisting of the first material, and a fourth strip, consisting of a second material, taken all together, have the width of the strip to be produced. The second strip, the third strip and the fourth strip are equal in thickness and are combined with the first strip in such a way that the three strips will be positioned one beside the other on the first strip, completely covering the latter, and the fourth strip consisting of the second material will be arranged between the second and the third strips in the nip or shortly before the nip formed between two working rolls that are part of a roll stand. The material fed into the nip, therefore, consists of a "second arrangement of strips", in which the four strips together fill a rectangular cross-section of a width corresponding to the width of the strip to be produced and of a height greater than the height of the strip to be produced. Provided the strips forming such second arrangement of strips fill the cross-section of the second arrangement of strips without any gaps, the second arrangement of strips will behave during rolling, in terms of reduction of thickness (reduction per pass), in the same way as a uniform strip. The width of the different strips is maintained, while their thickness is reduced according to the selected reduction per pass. The reduction per pass is selected depending on the materials to be bonded so that a sufficiently strong connection between the strips, that are to be plated one onto the other, will be achieved by the rolling process. The exact reduction per pass to be selected in a particular case can be determined by any man skilled in the roll-plating field, based on his technical knowledge. In many cases, a reduction per pass of between 50% and 70% will give the desired results. If a reduction per pass of 66.6%, for example, is selected, the strips used would thus have to be combined to form a "second arrangement of strips" of rectangular cross-section having a width corresponding to the width of the strip to be produced, and a height equal to three times the height of the strip to be produced. The height of the second, third and fourth strips should be selected in this case to be three times the thickness of the strip consisting of the second material, which that strip is intended to have in the plated strip at the end of the plating operation.

The manner in which die dimensions of the second arrangement of strips change during the rolling operation being clearly foreseeable, the width and the height of the different strips to be combined with the second strip arrangement for forming a plated strip of predetermined dimensions can be clearly determined in advance.

If and to the extent, based on the particular selection of materials, two strips to be plated one onto the other, lend themselves for plating either not at all or not easily, an intermediate layer may be provided which is capable of improving the bond of or even acting as intermediate for the bond. This applies especially to strips made from the same material, since strips consisting of the same material will not or not easily bond one to the other during rolling. In such cases, an intermediate layer consisting of a different material, that will bond easily to the selected material, is useful. Two copper strips, for example, can be easily bonded by roll plating with the aid of an intermediate silver layer. The intermediate layer may be introduced between two strips, consisting of the same material, in the form of a thin strip. However, given the fact that the intermediate layer may be very thin—a thickness of a few .mu.m will be sufficient—it is preferred to prepare one of the two strips, consisting of the same material, that are to be bonded by the roll plating operation for the plating operation by depositing the intermediate layer of a different material on that strip by one of the known physical or chemical separation processes, especially by a galvanic separation process. The thickness of the intermediate layer is correspondingly reduced by the reduction per pass.

The strip produced by roll plating is then, preferably, subjected to a heat treatment in order to increase the strength of the plating bond by diffusion processes. As a result of such a heat treatment (diffusion annealing) the metal of the intermediate layer diffuses into the adjoining strips and is then generally no longer visible in the micrograph as an intermediate layer. If the thickness selected for the intermediate layer at the outset is not greater than necessary to achieve the desired function, namely to provide for sufficient bonding strength, then the intermediate layer will not result in a possibly undesirable change in material properties of the two strips that are bonded one to the other using that intermediate layer.

A strip, consisting for example of copper with a strip-shaped inlay plating of silver, for example, can thus be produced by combining a copper strip having the width of the strip to be produced with a second copper strip, a third copper strip and a fourth strip consisting of silver, which together have the same width as the first copper strip and the same thickness one relative to the other, and where the second and the third copper strips have been galvanically coated on one side with silver in a layer thickness of 2 .mu.m to 4 .mu.m, to form a "second strip arrangement", and by then rolling the latter. The copper strips bond together via the deposited silver layer. The silver strip and the first copper strip bond together directly. The three copper strips of such a "second arrangement of strips" form the "first arrangement of strips" described in Claim 1, wherein the copper has a staggered boundary area between the outer longitudinal edges of the strips over their cross-section, namely at the two narrow sides (flanks) of the second and the third copper strips facing each other.

For carrying out the method according to the invention, it is not necessary to first combine the strips of the first arrangement of strips and to then add the further strips that complement the first arrangement of strips to form a second arrangement of strips of rectangular cross-section. Rather, it is important only that a second arrangement of strips of rectangular cross-section be delivered into the nip of the working rolls that carry out the rolling operation. The order in time in which the different strips forming the second arrangement of strips are combined before they enter the nip is uncritical. Preferably, they are combined simultaneously, as this promises to require the least mechanical input.

A strip with a front edge plating may be made from three different strips, namely a strip consisting of a first material with rectangular cross-section of a width that corresponds to the width of the plated strip to be produced, a second strip consisting of the first material and a third strip consisting of a second material, the second strip and the third strip having the same thickness and, taken together, the same width as the first strip. Assuming that the third strip and the first strip can be bonded one to the other by roll plating, while the first strip and the second strip cannot, one first coats the second strip on one side galvanically with the metal, which makes up the third strip or dominates in its material but differs from the material of the first and the second strips. Such an intermediate layer then permits the second strip to be plated onto the first strip. The three strips are combined for this purpose to form a rectangular "second arrangement of strips" and are then commonly subjected to a rolling operation after which they are welded together over their entire surfaces. After having been wound up on a winch, for example, they can then be subjected to an additional diffusion annealing process in order to improve the bond of the plated strip.

The result of the method according to the invention in both examples is a roll-plated strip with rectangular cross-section the production of which—unlike the prior art—did not require any cutting operation although the first material in the roll-plated strip has a staggered boundary area, in the first example even two such staggered boundary areas, extending in the longitudinal direction between the two outer edges of the strip.

The method of the invention permits the production not only of strips of rectangular cross-section, but also of strips that have a staggered profile in the longitudinal direction and, therefore, a non-rectangular cross-section. If, for example, the strip, that does not consist of the first material, is replaced in the two before-mentioned examples by another strip which does not lend itself for plating onto the first material by rolling so that after the rolling operation it will adhere to the strip of the first material either not at all or at best comparatively slightly only, then that strip can be removed from the plated strip after the rolling operation especially by pulling it off the plated strip and winding it up on a separate winch. As that other strip is removed again after the rolling operation, it will be described hereafter also as "lost inlay". As in most of the cases the strips, consisting of the same material, cannot be firmly bonded one to the other by rolling, a strip of the first material can be used as a lost inlay, in which case there is no need for an intermediate layer as bonding means between that strip and the opposite strip consisting of the same material. However, there is also the possibility to use a strip of a third material as a lost inlay, if that material is suited for use as a lost inlay, and it is even preferred to do so if the result is less costly because, for example, the lost inlay when made from the same material can be cheaper than a lost inlay consisting of the first material. In case a material, which is as such suited for use as a lost inlay, is relatively expensive then there is also the possibility to use a plated strip as lost inlay, which mainly consists of a low-cost material that can be bonded to the first material by roll-plating and which for this purpose is coated with a thin layer, for example of the first material which would not bond firmly to the first material by rolling.

The use of one or more lost inlays permits a great variety of strips having one or more longitudinal grooves and/or steps to be produced by the method according to the invention, which otherwise would have to be produced at great cost using a cutting operation, especially by milling, and which according to the invention can be produced at much lower cost and much more precisely solely by rolling.

Even the production of strips with a hollow section extending in longitudinal direction should be possible using the method according to the invention, in which case a lost inlay, which initially fills the full space of the hollow section, would be removed again after the rolling operation. In order to permit the lost inlay to be removed from the rolled strip, it would however be necessary to cut the strip into sections of some length, although in addition to the possibility of pulling out the inlay it would also be possible to use an inlay consisting of a strip that melts at low temperature, for example a tin strip, which could then be pulled off in the molten condition, for example in connection with a diffusion annealing operation, or else a lost inlay consisting of a material that can be molten or pyrolized by heating.

A lost inlay can be employed not only for producing grooved strips, staggered strips or hollow-section strips consisting of a single material, but also for producing complex composite strips consisting of two or more than two different materials. The before-mentioned strip-shaped semi-finished product for electric laboratory resistors, which consists of two staggered copper strips extending in parallel and in spaced relationship one beside the other and which are connected by a manganine strip, which is placed on the steps of the two copper strips and which is thinner than the copper strips so that it does not project beyond the latter, is an example of such a strip composed of a plurality of materials. While conventional methods have to rely on milling and welding operations for producing such a complex strip-shaped semi-finished product, the invention permits such strips to be produced solely by rolling operations:

One takes two copper strips of equal thickness and rectangular cross-section and arranges them in parallel one to the other and at the spacing which the copper strips are to have in the complete semi-finished product. One then takes two unilaterally silver-plated copper strips of a width smaller than that of the two first copper strips and arranges them on the latter so that the pairs of their longitudinal edges come to lie exactly one above the other. The width of the narrower copper strips is selected so that, when arranged in this way on the wider copper strips, their spacing is equal to the predefined width of the manganine strip in the completed semi-finished product. One further takes a manganine strip, of just that desired width and a thickness equal to the thickness of the two narrower copper strips, and positions it between the two narrower copper strips. The five strips together form the "first arrangement of strips" according to Claim 1. In order to complement it to form the "second arrangement of strips", a further strip is introduced as lost inlay between the two wider copper strips. The lost inlay may consist of a manganine strip, or else of a cheap steel strip. Once all the six strips have been combined to form the "second arrangement of strips", the latter is rolled down to the thickness of the semi-finished product to be produced, using a reduction per pass of, for example, 60% to 65%, whereby the copper strips and the wider manganine strip are bonded together, whereas the narrower manganine strips will bond neither to the wider manganine strip nor to the copper strips arranged on both sides thereof because the rolling force acts at a right angle to the axis of rotation of the working rolls. Once the material has left the nip, the narrower manganine strip can, therefore, be removed again, for example by pulling it off, and can be wound up. What remains is a copper-manganine semi-finished product with highly precise dimensions, joined solely by rolling operations, where the manganine does not project beyond the upper face and assumes the form of a special inlay plating in the form of a bridge that could be produced by roll-plating only because a lost inlay was used.

In order to improve the dimensional accuracy of the strips to be produced according to the invention, and their surface quality, it is preferred that the strips be equalized after the roll-plating process by subjecting them to the action of equalizing rolls either before or after removal of the lost inlay or inlays. The term equalizing is used to describe rolling of the strip in a skin pass stand with a highly constant nip, whereby variations in thickness of the metal strip are reduced at a minimum reduction per pass. Skin pass stands have been known from DE 25 41 402 C2, to which reference is herewith made for further details. In a skin pass stand suited for purposes of the invention, a highly constant nip is achieved by applying, on the roll pins that extend outwardly beyond the roll pin bearings of two backing rolls; one of which supports the lower equalizing roll from below while the upper one supports the upper equalizing roll from above, biasing forces directed away from the material to be rolled and perpendicularly to the roll axes, which forces may be vertically directed and may, preferably, act along a long a line of action that deviates from a plane of the roller axes by the rolling angle and that intersects the incoming strip. This reduces the working play of the equalizing rolls in the roll pin bearings. For purposes of the invention, a skin pass roll may be arranged downstream of the plating roll stand containing the two working rolls that form the nip into which the "second arrangement of strips" is fed.

The working rolls, just as the skin pass rolls, conveniently are cylindrical.

Rolling for plating purposes can be performed as a cold-roll plating process or a hot-roll plating process. Preferably, it is performed as a cold-roll plating operation, unless high hardness of the strips to be plated would suggest the hot-roll plating operation to be more suited.

The method according to the invention can be carried out using conventional roll stands. On its run-in end, the roll stand must be supplemented by means for combining the different strips to form the "second arrangement of strips" and for guiding the latter into the nip. On its discharge end, the roll stand must be supplemented by means for winding up the plated strip, if necessary also by means for separating one or more lost inlays from the roll-plated strip and for winding them up, and a skin pass stand may be provided either upstream or downstream of the means for separating lost inlays.

Depending on its destination, the roll-plated strip, having been freed from lost inlays, if any, may then be wound up on a winch or be cut into pieces of selectable length for further treatment, especially by an initial diffusion annealing process.

For supplying the different strips, one conveniently uses a plurality of winches, although strips of equal thickness that are to be arranged one beside the other in the "second arrangement of strips" may of course be unwound from a common winch on which they had been wound up before one beside the other. Guide surfaces and/or guide rollers may be provided between the winches and the working rolls of the plating roll stand for combining the different strips in the desired manner to form the "second arrangement of strips".

The roll-plated strip, having been wound up on a winch, for example, may by placed as a coil in a heat-treating furnace for being subjected to a diffusion annealing process.

The roll-plating operation performed on the second arrangement of strips does not, as a rule, connect the flanks of strips that are placed one beside the other and that are in contact by their flanks, because the rolling force acts at a right angle relative to the rotary axes of the working rolls. The strip leaving the nip may therefore show gaps between adjacent strips which may be undesirable for the first arrangement of strips. Such gaps can be avoided by the further development of the invention according to Claim 27. The strips are heated in this case, at least in the area of their contacting flanks, to a temperature at which the material of the flanks will directly bond together. Preferably, this process is supported by guiding the second arrangement of strips during the rolling operation in such a manner that the strips cannot move to the side within the nip.

If the strips are heated up to that temperature after the rolling operation, one makes use of the phenomenon that, depending on the selected reduction per pass, the strips not only get longer during rolling, but also tend to slightly gain in width. As, preferably, the strips are guided during the rolling operation so that they cannot move to the side within the nip, the tendency of the strips to become wider during the rolling operation leads to increasing pressure between the contacting flanks of the strips, which results in microscopically fine mechanical interlinking of the flanks in contact one with the other.

When the strips are then heated, at least in the area of their contacting flanks, the material of the flanks, which already have been joined as a result of the rolling operation, is permitted to bond if the temperature reached in the area of the flanks is high enough to produce a liquid phase between the contacting flanks.

This provides considerable advantages: [0052] The rolling operation produces a provisional joint between two strips that are to be bonded by their flanks, which is then converted to a durable bond by the subsequent heating process. [0053] The provisional joint between the strips, produced by the rolling operation, comprises innumerable points of contact that form the basis for the formation of a liquid phase during the heating process which then causes the materials of the strips to bond along their flanks within a short period of time. [0054] Due to unavoidable irregularities along the flanks, spaces are unavoidably formed between the flanks when the latter get into contact one with the other. These unavoidable spaces are minimized by the rolling operation. [0055] The minimized spaces between the flanks can be filled with a liquid phase of minimum volume. This finally results in a very fine, narrow, uniform and straight bonding seam. [0056] The method is especially advantageous for bonding strips that differ with respect to the composition of their materials. It may, however, also be used for strips that are identical one to the other with respect to the composition of their materials. [0057] The steps of heating and subsequent cooling can be used simultaneously for annealing the strips, especially in order to adjust a desired hardness.

Strips whose different material compositions are such that when heated together they will form an alloy whose melting point is lower than the melting point of the one strip and of the other strip, as is the case for example when bonding a silver strip to a copper strip, can be directly bonded using the method according to the invention. In the case of strips of identical compositions, and in the case of strips with different material compositions which, when heated together, will not form a lower melting point liquid phase in their zone of contact, or would form such a phase only at an unreasonably high temperature, it is provided according to a further development of the invention that a solder may be used in the bonding zone, with both hard solders and soft solders being useful for this purpose. The solder can be applied on one or both flanks to be connected. If a solder alloy is used, for example a silver/copper hard solder alloy, it is possible to apply one component of the alloy, for example the silver, on the flank of the one strip and the other component of the alloy, for example the copper, on the flank of the other strip. In this case, the alloy will be formed only during the heating process. There is also the possibility to apply a metal on the flank of one of the two strips, which when heated forms with the metal of the other metallic strip an alloy having a lower melting point than the material of the one strip and the material of the other strip. When bonding a copper strip to a manganine strip, for example, it would be sufficient to coat only the flank of the manganine strip with silver, which when heated up to 780 degree. Celsius will then form a silver/copper eutectic with the copper from the contacting copper strip.

It is of advantage in this connection that due to the intimate interlacing produced between the two flanks to be bonded by the rolling operation, only a minimum quantity of the solder will be required so that in most of the cases any alteration of the properties of the one or of the other strip, that may result from the use of a solder, can be neglected. When bonding a copper strip to a manganine strip, for example, the silver layer to be applied to the flank of the manganine strip may be as thin as 2 .mu.m to 3 .mu.m so that it will be absorbed practically in full by the silver/copper alloy forming during the heating operation and the amount of diffusion of the silver into the manganine will remain so small that the latter's electric resistance will remain practically unchanged. In addition, there is also the possibility, if desired in the particular case, to prevent diffusion of a solder component into one of the strips by the use of an intermediate layer, hindering such diffusion, that is applied on the flank of the respective strip before application of the solder. Diffusion of silver, for example, can be effectively counteracted in this way by an intermediate nickel layer.

Especially well suited as a method for applying a solder metal is the galvanic separation process which can be implemented at low cost, can be selectively limited to the flanks, can be carried out as a continuous process and can be easily controlled with respect to the layer thickness. However, other known separation methods for metal can likewise be used for purposes of the invention for coating a flank of the strip with a solder metal. If desired, the respective strip may be coated also on additional surfaces by the same operation.

There are several different ways of preventing the strips from moving to the side in the nip during the rolling operation. One of those ways consists in providing the roll stand with a first working roll that comprises a recess which extends around the roll in circumferential direction and whose width is exactly tuned to the width of the arrangement of the strips to be bonded. The lateral boundary of that recess prevents the strips from moving to the side. If the strips are rolled down to a thickness smaller than the depth of the recess in the first working roll, then the second working roll must be provided with a collar arranged opposite the recess of the first working roll and adapted to the width of the latter, by which the second working roll can dip into the recess of the first working roll.

According to another possibility, a roll stand with cylindrical working rolls may be provided with lateral guide elements both on the run-in end of the nip and on the discharge end of the nip, which guides act on the two outer edges of the strips and, preferably, can be varied as regards their relative spacing one to the other. That latter feature permits not only the system to be adapted to strips of different widths, but also the pressure, at which the two flanks to be bonded are pressed against each other in the nip, to be increased beyond the pressure that would result solely from the tendency of the strips to widen, encountered during the rolling operation.

Following the rolling operation, the composite strip obtained from the first arrangement of strips can be wound up on a winch, transferred to an annealing furnace, for example a bell furnace, and can be heated in the latter, especially in a protective gas atmosphere, to a temperature at which a liquid phase will form between the flanks to be bonded. Another possibility consists in guiding the composite strip, after it has left the nip and before it is wound up, through a heating zone in which it is continuously heated up to the temperature required for producing a material connection between the flanks. The length of the heating zone can be adapted for this purpose to the speed at which the continuous strip leaves the nip. Continuous furnaces for heat-treatment of metals in a protective gas or reactive gas are known in the art. They allow the length of time of the heat treatment to be optimized and the occurrence of the liquid phase to be limited to a short period of time sufficient to produce a firm connection without unnecessarily affecting the strips as such. The heating zone may be followed by a cooling zone in which the composite strip may be cooled, or even quenched, under controlled conditions for optimizing its mechanical properties.

Other ways of heating the continuous strip leaving the strip consist in the use of an electric induction coil for inductively heating up the continuous strip or—if the continuous strip has a suitable electric resistance—directly heating up the composite strip by means of an electric current flow through strip, by applying electrodes to the strip by means of which the electric current is passed through the strip. This last-mentioned possibility allows the current flow and, thus, the heat production to be concentrated especially to the area of the flanks to be bonded.

In order to obtain a composite strip free from distortion, it is of advantage to exert a tension force on the composite strip as it leaves the nip. However, the tension force should not be high enough to permanently elongate the strip, in addition to the elongation it has suffered before as a result of the rolling operation. Heat-treating the cold rolled strip in a continuous operation generally also provides the possibility to exert the tension force on the composite strip by the winch winding it up. Due to the reduction in strength the composite strip has suffered in the heating zone, the tension force is, however, limited so that the use of low melting point solders is preferred. The solder L-Ag15P according to DIN 8513, which melts at a temperature of approximately 645.degree. Celsius, may serve as an example of such a low melting point hard solder.

One possibility of reducing the tension force required for obtaining a distortion-free strip consists in using a warm-rolling operation instead of a cold-rolling operation.

Another advantageous possibility to obtain a distortion-free strip even at temperatures so high that the tension force required to obtain a distortion-free strip cannot be applied after the heating zone at the discharge end of the roll stand, consists in separating the at least one additional strip, that has been used for complementing the "first arrangement of strips" to form the "second arrangement of strips" from the first arrangement of strips, after the strip has left the nip, winding it up on a separate winch and delivering the continuous strip arrangement into the heating zone only thereafter. The winch used for winding up the additional strip can now apply the tension force necessary for obtaining a distortion-free rolled composite strip.

If the strips are heated up to a temperature at which the contacting flanks form a material bond between them before the rolling step, and if the temperature in the nip is then lower again than the temperature at which the flanks can form a material bond directly, then the bond already produced will be further reinforced by the rolling process in combination with the lateral guides provided for the strips. If, in contrast, the temperature in the nip is still at a level at which the flanks can form a material bond between them, then the hot-rolling operation and the subsequent cooling step will produce the desired firm material bond between the contacting flanks of the strips.

In both cases in is important that during rolling the strips be guided jointly so that they cannot move to the side in the nip. Preferably, the joints are guided jointly, to prevent the strips from moving to the side, already in the zone where they are heated.

Preferably, the strips are heated immediately before the rolling operation, and are rolled in hot condition. The operations of heating, guiding and rolling are then concentrated to a small, but clearly controllable area which can be placed under protective gas, if required, without greater difficulty.

For producing strips of complex structure, the invention also provides for a two-step process according to which initially a strip of simpler structure is produced according to the method of the invention, which is then connected with further strips to form a complex strip by an additional operation according to the invention.

BRIEF DESCRIPTION OF THE SEVERAL VIEWS OF THE DRAWINGS

Certain exemplary embodiments of the invention are shown in the attached drawings in which identical or corresponding parts are indicated by the same reference numerals.

FIG. 1 shows a diagrammatic side view of a cold-roll plating system;

FIG. 2 shows a top view, sectioned in part, of the same system, the section being taken along the line indicated in FIG. 1;

FIG. 3 shows a two-layer strip with an inlay plating and a front edge plating produced according to the invention;

FIG. 4 shows a cross-section of a staggered-profile strip with a groove extending in the longitudinal direction and a step extending in the longitudinal direction;

FIG. 5 shows a cross-section of a two-layer strip suited for use as semi-finished product for the laboratory resistors illustrated in FIG. 6 and FIG. 7 which show an oblique view of those resistors;

FIG. 8 shows a cross-section of a three-layer strip for the production of the hollow-section strip illustrated in FIG. 9 which shows a view of that strip;

FIG. 10 shows a cross-section of a three-layer strip modified relative to the strip shown in FIG. 8 insofar as it additionally comprises a lost inlay on one of its front edges, which inlay can be removed for forming the strip illustrated in FIG. 11 which shows a representation of that strip;

FIG. 12 shows a cross-section of a three-layer strip with three lost inlays for producing the staggered-profile strip illustrated in FIG. 13;

FIG. 14 shows a cross-section of a three-layer strip with four lost inlays for producing the staggered-profile strip illustrated in FIG. 15 which shows a cross-section of that strip;

FIG. 16 shows a representation, similar to that of FIG. 1, of a modified roll-plating system;

FIG. 17 shows a top view, sectioned in part, of the system illustrated in FIG. 16, the cross-section being taken along the line indicated in FIG. 16;

FIG. 18 shows an enlarged detail of FIG. 16;

FIG. 20 shows to working rolls, which are especially designed for the system illustrated in FIGS. 16 to 19; and FIG. 21 shows a representation, similar to FIG. 18, of a modification of the system.

DETAILED DESCRIPTION OF THE SEVERAL VIEWS OF THE DRAWINGS

Figure 6:
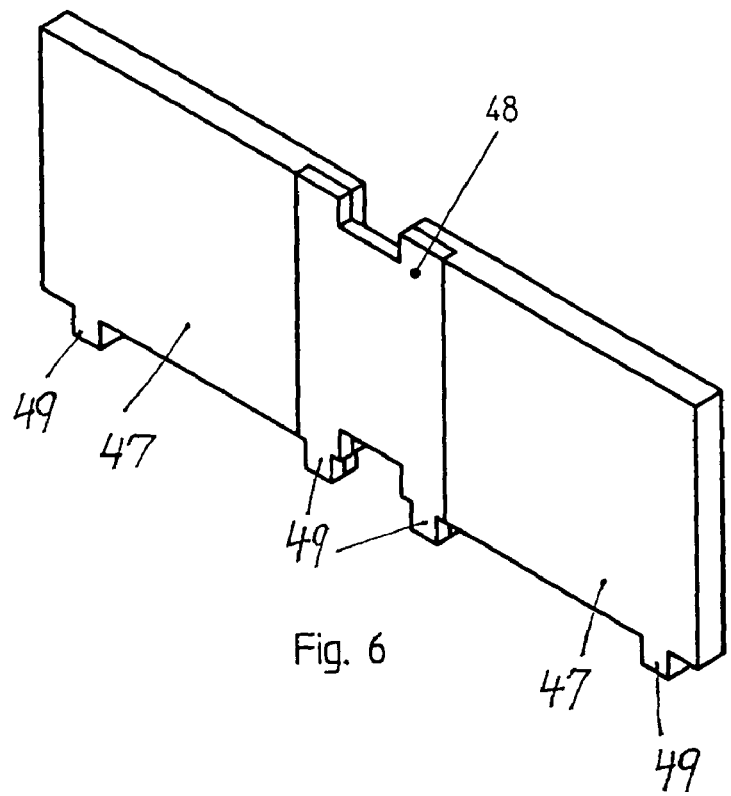

FIGS. 1 and 2 show a roll stand 1 with two cylindrical working rolls 2 and 3 that are seated in working bearings 4 and are supported by one upper backing roll 5 and one lower backing roll 6, seated via roll pins 7 and 8 in roll pin bearings provided in lateral mounting members 9 of the roll stand 1. The upper working roll 2 and the lower backing roll 6 are driven via cardan shafts, of which only the lower cardan shaft 10 for the lower backing roll 6 is shown in FIG. 2, by an electric motor 11 via a gearing 12. The other two rolls 3 and 5 are entrained by frictional engagement with the driven rolls 2 and 6.

The roll stand 1 is followed by an equalizing roll stand 13 which has its nip at the same level as the nip of the roll stand 1. The equalizing roll stand 13 comprises a pair of equalizing rolls 14 and a pair of backing rolls 15 which may be considerably smaller than the corresponding rolls in the roll stand 1, because of the considerably lower rolling pressure forces encountered during the equalizing operation.

The strips to be delivered to the rolls are wound up on winches 16, 17 and 18, arranged one behind the other along one line. Each of the winches 16, 17 and 18 comprises a separate frame 16a, 17a, 18a, which contains a drive 19 for the respective winch. Each winch includes a carrier for one or more coils 16b, 17b and 18b. The carriers and, together with them, the coils 16b, 17b and 18b can be displaced transversely to the rolling direction R by rods 20 guided horizontally for the purpose of adjusting the position of the strips 22, 23 and 24 being pulled off the winches 16, 17 and 18.

With the aid of the three winches 16, 17 and 18 it is possible to deliver to the roll stand 1 a three-layer strip arrangement, with the three layers of strips 22, 23 and 24 being united a short distance before the roll stand 1 in a horizontal clearance formed between two guide rolls 21 at the level of the nip of the roll stand 1.

The first winch 16 contains one or more coils 16b, arranged one beside the other, for forming a first lower layer 22 of a "second arrangement of strips". The second winch serves to receive one or more coils 17b for forming a second layer 23 of the "second arrangement of strips". The third winch 18 serves for receiving one or more coils 18b, arranged one beside the other, for forming a third layer 24 of the "second arrangement of strips". For producing a four-layer strip arrangement, one would add an additional winch. For producing a two-layer strip arrangement only, one would have to use only two of the winches. If a plurality of coils are to be arranged on one winch, it is of course necessary that the coils be identical in diameter and that the strips have the same thickness.

Between the roll stand 1 and the equalizing roll stand 13, there can be seen a winding-up winch 25 for one or more inlay strips 26 from the lower layer of the second arrangement of strips. Behind the equalizing roll stand 13, there can be seen a winding-up winch 27 for the strip 28 to be produced. An additional winding-up winch 29 for lost inlay strips 30, if any, from the upper layer 24 of the second arrangement of strips is located downstream of the winding-up winch 27. The winding-up winches 25, 27, 29 are seated and driven in the same way as the winches 16, 17 and 18 so that these aspects need not be explained here in more detail.

FIG. 3 shows a cross-section of a rectangular two-layer "second arrangement of strips" composed of five different strips that are to be bonded together by a roll-plating operation: A first strip 31, consisting of a first material, extending over the full width of the strip to be produced, four narrower strips 32, 33, 34 and 35 of identical thickness, which together have the same width as the first strip 31 and of which the first strip 32—arranged on the left side of the drawing—consists of a first material while the next strip 33 consists of a second material, the next following third strip 34 again consists of the first material and the last strip 35 again consists of a second material. The first material may, for example, be copper or a copper alloy, the second material may, for example, be silver or a silver alloy. In order to ensure that the strips 32 and 34 will bond to the strip 31, the strips 32 and 34 are coated galvanically with silver in a thickness of 2 .mu.m to 4 .mu.m on their sides facing the strip 31.

The first strip 31 is pulled off the second winch 17, the other four strips 32 to 35 are pulled off the first winch 16, on which they form coils 16b of identical diameter arranged one beside the other. The five strips 31 to 35 are guided through the nip between the guide rolls 21 and into the nip of the roll stand 1, are pulled through the latter and are then guided into the nip of the equalizing roll stand 13, pulled through the latter, and are fixed on the winding-up winch 27 which will exert a defined tension force on the material to be rolled during the subsequent rolling operation.

In the nip of the roll stand 1, the second arrangement of strips, illustrated in FIG. 3, is reduced in thickness by a certain reduction per pass. If the change in thickness produced by the rolling process is left out or regard, FIG. 3 therefore represents both the "second arrangement of strips", which is delivered to the nip of the roll stand 1, and the finished strip produced by the rolling operation. The rolled strip present on the winch 27 may be removed from time to time as coil, for being transferred to a heat-treating furnace for diffusion annealing.

In the strip illustrated in FIG. 3, the first material (consisting of copper in that example) has three longitudinally extending boundary areas 38a, 38b and 38c forming a step in the area between the longitudinal edges 36 and 37. If produced in the conventional way such steps would have had to be formed by a cutting operation, especially by milling.

When modifying the example illustrated in FIG. 3 by replacing the silver strips 33 and 35 by strips consisting of the first material, which unlike the strips 32 and 34 are not silver-plated, no adhesion effect is obtained by the rolling operation between the strips 33 and 35 on the one hand and the first strip 31 on the other hand. Instead, as the strips 33 and 35 leave the roll stand 1, they may be separated from the "first arrangement of strips", formed by the strips 31, 32 and 34, and be wound up on the winding-up winch 25, whereas the "first arrangement of strips", formed by the strips 31, 32 and 34 has been transformed, by the rolling operation, to a composite strip that exhibits a longitudinally extending groove 39 and a step 38c on its outside and which can be wound up on the winding-up winch 27 after it has passed the equalization roll stand 13.

A profiled strip of that kind, illustrated in FIG. 4, practically consists of a single material. The thin intermediate silver layer used as plating aid does not really change the properties of the first material; during the subsequent diffusion annealing process, the silver will diffuse into the first material, and is then generally no longer detectable in the micrograph.

Figure 7:
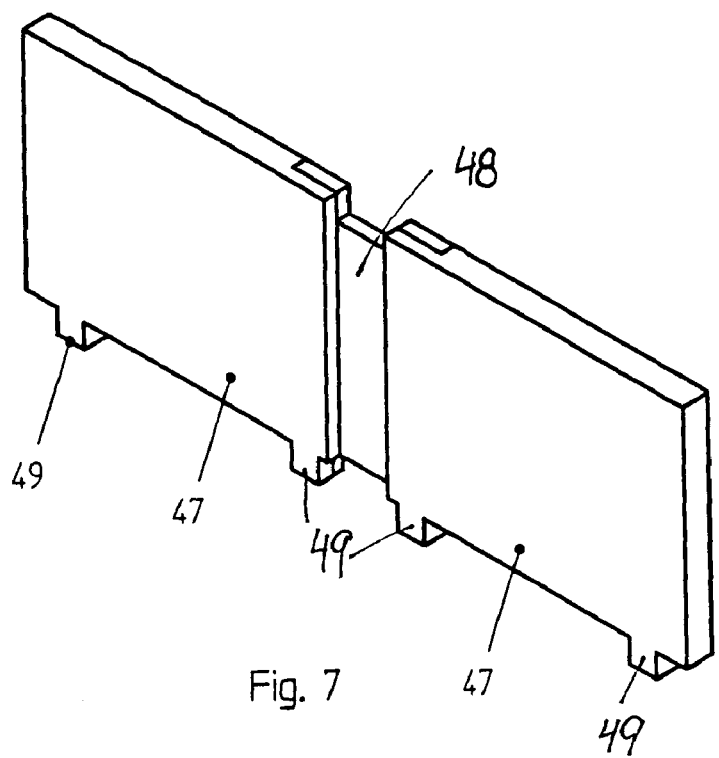
Figure 19:
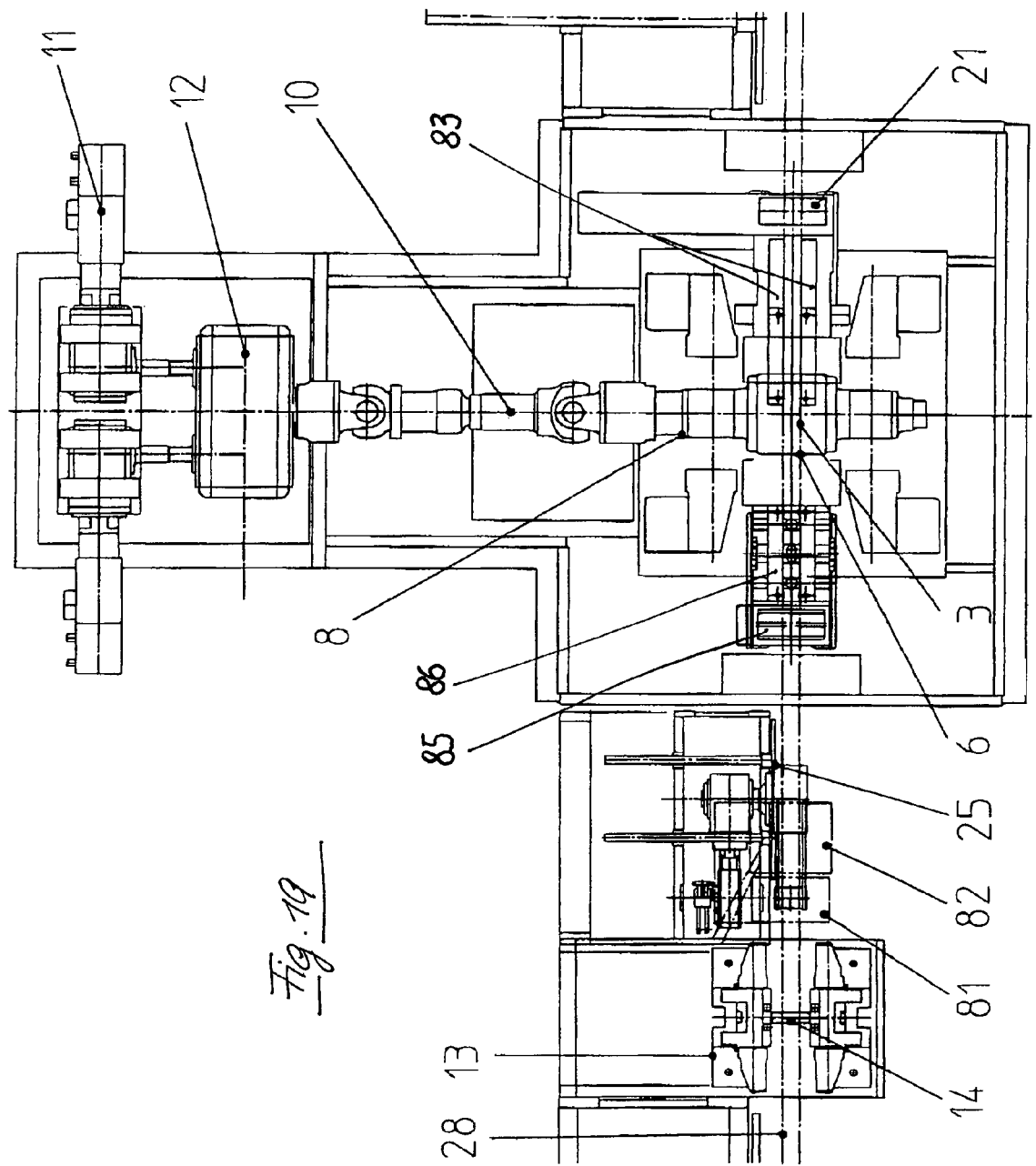
FIG. 19 shows an enlarged detail of FIG. 17.

FIG. 5 shows a two-layer strip arrangement 40 that comprises two copper strips 41 and 42, arranged at a spacing one from the other, and between them a narrower manganine strip 43, all of them having the same thickness. The second layer comprises two copper strips 44 and 45, which are narrower than the copper strips 41 and 42 and are, accordingly, arranged at a somewhat greater spacing, with a strip 46 of manganine enclosed between them. The strips 44, 45 and 46 have the same thickness one relative to the other, and the strips 41, 42 and 43 taken together have the same width as the strips 44, 45 and 46. The strips 41, 42 and 43 of the first layer arrive from the first winch 16, the strips 44, 45 and 46 of the second layer from the second winch 17. The detail shown in FIG. 1 above the winch 16 for that example indicates symbolically how the strips 41, 42 and 43 of the first layer run off the winch 16 one beside the other. Correspondingly, the detail shown above the winch 17 indicates how the strips 44, 45 and 46 run off the winch 17 one beside the other. The strips 44 and 45 are provided with a thin silver coating on their bottom surfaces. This has the effect that during the rolling operation the strip 44 will bond to the strip 41, the strip 45 will bond to the strip 42, the manganine strip 46 will bond to the copper strips 41 and 42, but not to the manganine strip 43; instead, the latter will form a lost inlay, which will be removed again after the plating operation and will be wound up on the winding-up winch 25, while the remaining composite strip will be wound up on the winding-up winch 27. This composite strip then serves as a starting material for producing, by cutting and punching operations, laboratory resistors that are shown, from the one side, by the oblique view of FIG. 6 and, from the other side, by the oblique view of FIG. 7, and that consist of two terminal lugs 47 of copper, connected by a bridge 48 of manganine, and connection legs 49 that can be fitted in matching plug-in connectors. Given the fact that the semi-finished product for those laboratory resistors is made exclusively by rolling from strips of rectangular cross-section, without any need for milling or welding operations, the dimensional accuracy and the surface quality of the semi-finished products are so high that the laboratory resistors will present much lower variation in resistance values than resistors produced according to the prior art.

FIG. 8 shows a "second arrangement of strips" 50, formed from three layers, where the first layer consists of a single strip 51 of a first material, the second layer consists of three strips 52, 53 and 54 of equal thickness, with the strips 52 and 54 placed one beside the other in spaced arrangement and consisting of a first material, while the strip 53 is arranged between them as a lost inlay. The third layer consists again of a single strip 55 identical to the strip 51 of the first layer. The first material may be a steel, for example. In order to ensure that the strips 51 and 55 will bond to the strips 52 and 54, the strip 52 and 54 may in this case have a thin copper plating on both sides. The lost inlay 53 may consist of a steel strip, without a copper plating, or of a strip of a low melting point metal, such as tin. Following the roll-plating process, the inlay 53 can be pulled off by sections as the roll-plated strip is cut to sections of suitable length. The low melting point inlay 53 can be liquefied by suitable heat-treatment and can be expelled or exhausted. One thus obtains a roll-plated hollow-section strip as illustrated in FIG. 9.

The strip illustrated in FIGS. 10 to 11 differs from the one illustrated in FIGS. 8 and 9 in that the strip 54 of the second strip is replaced by two narrower strips 56 and 57 that are delivered from the winch 17, together with the strips 52 and 53. The strip 56 consists of a first material and is copper-plated on both sides, for example. The strip 57 consists of a different material and forms a lost inlay; it consists of a steel, which does not bond to the first material. While the strip 53 for the lost inlay can be removed in the way described before, the strip 57, forming a lateral lost inlay, can be pulled off to the side and can be wound up. The result is a hollow-section strip consisting of a single material and having the cross-sectional shape illustrated in FIG. 11, which in addition to the hollow space 58, which was occupied before by the lost inlay 53, comprises a slot 59 open to the side that remained after removal of the lost inlay 57.

FIGS. 12 and 13 show an embodiment which starts out from a two-layer strip arrangement of the kind illustrated in FIG. 5, but whose arrangement is supplement by a third layer in which five strips 61, 62, 63, 64 and 65, all having the same thickness, are arranged one beside the other, the strip 61 consisting of the same first material as the strips 41, 42, 44 and 45. The strip 62 consists, for example, of a precious metal, while the strip 63 forms a lost inlay, consisting for example of a steel. The strip 64 consists of the same first material as the strip 61, and the strip 65 forms again a lost inlay consisting of a material that does not bond to the first material. The five strips of the third layer may be supplied from the winch 18, provided they form coils of identical diameter on the winch. The detail shown above the winch 18 illustrates symbolically how the five strips 61, to 65 of the third layer run off the winch 18 one beside the other. The strips of the first and the second layers run off the winches 16 and 17, as has been described before in connection with FIG. 5. The strips 61 and 64 have their lower surfaces provided with a thin silver coating, for example, so as to ensure that they will bond to the strips 44 and 45 as the "second arrangement of strips" 60 according to FIG. 12 is guided through the roll stand 1. Following the roll stand 1, the lost inlay 43 is initially separated from the second arrangement of strips 60 and is then wound up on the winding-up winch 25. The remaining composite strip then passes the equalization roll stand 13. Following that step, the lost inlays 63 and 65 are separated from the remaining composite strip and are wound up on the winding-up winch 29, whereas the remaining composite strip, which is formed by and was to be produced from the "first arrangement of strips" and which is represented by the sectional view of FIG. 13, is wound up on the winch 27. That remaining strip comprises two different staggered-profile strips 66 and 67 of the first material, the strip 66 being plated with the precious-metal strip 62, and both strips 66 and 67 being connected by a bridge formed by the strip 46, which latter does not consist of the first material and may also be different from the material of the strip 62. It is surprising to see that it was possible to produce this complex strip from separate strips of rectangular cross-section solely by rolling processes.

FIG. 14 illustrates the kind of "second arrangement of strips" that may be used to produce a staggered-profile strip 70 of the complex configuration illustrated in FIG. 15. The "second arrangement of strips" of FIG. 14 comprises in its first layer four strips of identical thickness and of rectangular cross-section, namely—from the left to the right—a strip 71 of a first material, a strip 72 forming a lost inlay, a strip 73 of the first material and a strip 74 forming a further lost inlay. The four strips arrive from a first winch 16. The second layer consists of a strip 75 of the first material. That strip is a little narrower than the four strips of the first layer together. The third layer of the strip 75 is formed by three strips 76, 77 and 78 of equal thickness which together have the same width as the strip 75, the strip 76 and the strip 78 consisting of the first material, the strip 77 forming a lost inlay. The strip 77 has a trapezoidal cross-section and may be produced, for example, by an extrusion process. The strips 76 and 78 comprise matching surfaces facing the strip 77, and may be formed from a strip of rectangular cross-section by a corresponding oblique separating cut. Finally, there is further provided a strip 79 for forming an additional lost inlay, which has the same thickness as the second layer and the third layer taken together and which complements such layers to form a rectangular cross section. The strip 75 of the second layer is delivered by the winch 17, the strips of the third layer are delivered by the winch 18. A fourth winch is required in this case for delivering the strip 79.

Once the "second arrangement of strips" illustrated in FIG. 14 has passed the roll stand 1, the inlays 72 and 74 are separated from the remaining strip and are wound up on the winding-up winch 25. The remaining strip then passes the equalizing roll stand 13. Following that step, the inlays 77 and 79 are pulled off, and the inlay strip 77 is wound up on the winding-up winch 29. The inlay strip 79 is wound up on a further winding-up winch not shown in FIG. 1. The remaining staggered-profile strip 70, having the cross-section illustrated in FIG. 15, is wound up on the winch 27, from which a coil can be removed from time to time for being transferred to a heat-treating furnace for diffusion annealing. The "first arrangement of strips" forming the staggered-profile strip 70 consists of the strips 71, 73, 76 and 78.

Contrary to the examples described above, the staggered-profile strip 70 illustrated in FIG. 15 comprises not only vertical steps but also two oblique steps.

Generally, the tension forces exerted on the strip by the winding-up winches 25 and 29, which pull and tension the respective strips, will be sufficient to separate and to wind up the lost inlays. In case the step of separating the lost inlays should prove to be more difficult with the one or the other combination of materials, it may be facilitated by wedge-shaped separating bodies provided in the gusset between the lost inlays and the remaining composite strip, as illustrated in FIG. 1 by way of example by the enlarged detail where a wedge-shaped separating body 80 can be seen between the inlay 26 and the remaining strip 28 at the point designated by A in FIG. 1. Correspondingly, a wedge-shaped separating body may likewise be provided at the point designated by B in FIG. 1 for separating the inlay 26 from the remaining strip.

The modifications illustrated in FIGS. 16 to 21 of the system according to FIGS. 1 and 2 are especially effective in preventing open gaps between the flanks of two neighboring strips united in the composite strip, for example between the strips 44 and 46 and the strips 45 and 46 in FIG. 5.

The system illustrated in FIGS. 16 to 19 comprises, in addition to the system shown in FIGS. 1 and 2, two guide elements 83 arranged on both sides of the strip arrangement, between the location of the guide rollers 21 and the nip, which guide elements can be varied in spacing and are in contact with the outer flanks of the outer strips of the strip arrangement during rolling in order to prevent the strips from moving to the side during the rolling operation.

The discharge end of the nip is followed by lateral guide element 86 for the strip leaving the nip, corresponding to the guide elements 83 on the run-in end of the nip. The guide elements 86 are followed by two horizontally arranged guide rollers 85 corresponding to the guide rollers 21 on the run-in end of the nip. The guide rollers 85 are followed, in the rolling direction R, by the first winding-up winch 25 and the heating zone 82 and the cooling zone 81. The latter are followed, in the rolling direction R, by the equalizing roll stand 13, the second winding-up winch 27 for winding up the composite strip 28 to be produced, and the third winding-up winch 29.

If, for example, the second strip arrangement illustrated in FIG. 5 is being rolled and the two outer strips 44 and 45 consist of copper and the inner strip 46 consists of manganine, then the two flanks of the manganine strip 46 are coated with a thin layer, approximately 2 .mu.m to 3 .mu.m thick, of a solder, for example a silver solder.

The strip arrangement is guided through the nip of the roll stand 1. On the discharge end of the nip of the roll stand 1, the additional "lost" strip 43 is initially separated from the first arrangement of strips and is wound up on the winding-up winch 25, which in this case applies the required tension to prevent distortion of the rolled strip arrangement. Only the first arrangement of strips 28, freed from the additional lost strip 43, is then conveyed through the heating zone 82 where a liquid phase is produced for a short time at a higher temperature adapted to the material combination present at the flanks between the strips 44 and 46 and the strips 45 and 46. Thereafter, the composite strip 28 is conveyed through the cooling zone 81. In this way, a firm bond is obtained between the flanks of the strips 44, 45 and 46 by a soldering operation. The winding-up winch 27 operates in this case with a relatively low tension force only, which is sufficient to smoothly wind up the composite strip 28.

Instead of the guide elements 83 and 86 illustrated in the example of FIGS. 16 to 19, it is likewise possible, for purposes of the invention, to use two working rolls 2 and 3 of special configuration in the roll stand 1. Such special working rolls are illustrated in FIG. 20. The lower working roll 3 comprises an annular groove 87 of rectangular cross-section, running around the lower working roll 3 in circumferential direction. Exactly opposite the annular groove 87, the upper working roll 2 is provided with a collar 88 of almost rectangular cross-section, whose width is closely adapted to the clear width of the annular groove 87 so that the collar 88 can dip into the annular groove 87 without jamming in it during operation. Such a pair of working rolls is suitable for being used according to the invention for rolling an arrangement that comprises a plurality of strips with a width equal to the clear width of the annular groove 87. The use of guide elements 83 and 86, as illustrated in the example of FIGS. 16 to 19, provides however the advantage that the guide elements can be adapted to strip arrangements of different widths and can be used continuously for the same cylindrical working rolls 2 and 3.

FIG. 21 shows a modification of the system illustrated in FIGS. 16 to 19. That modification consists in that heating means 90 are provided on the run-in end of the roll stand 1, which heat up the arriving strip arrangement 22 on its way from the guide rolls 21 to the working rolls 2 and 3. In the present case, the heating means consist of an electric heating system that heats the strips directly, in that the working rolls 2, 3 are connected to the one pole of a dc power source 91 while the guide rolls 21 are connected to the other pole of the dc power source 91. The circuit, which directly heats the arrangement of strips 22 is thus closed between the one pole of the dc power source 91 via the line 92 to the guide rolls 21, via the strip arrangement 22, the working rolls 2,3 and via a line 93 leading from the latter to the other pole of the dc power source 91. The highest temperature is obtained, as desired, immediately at the point where the strip arrangement 22 enters the nip. Conveniently, the system operates with low voltage and high amperage. The amperage is adapted to the material of the strips and their speed to ensure that the temperature required for achieving a material bond between the strips along their flanks will be reached in the nip at the latest.

In case the strips to be processed should oxidize in air at higher temperatures and such oxidation should be undesirable, the hot area can be protected by an enclosure. There is therefore provided a chamber 94, indicated diagrammatically in FIG. 21, in which a protective gas atmosphere can be maintained.

The heating zone 82, which in the embodiment illustrated in FIGS. 16 to 19 is located on the discharge end of the roll stand 1, can be omitted in the modified system illustrated in FIG. 21, whereas the cooling zone 21 provided in the embodiment of FIGS. 16 to 19 is conveniently also provided in the modified system of FIG. 21

LIST OF REFERENCE NUMERALS

1. Roll stand [0121] 2. Working roll [0122] 3. Working roll [0123] 4. Working bearing [0124] 5. Upper backing roll [0125] 6. Lower backing roll [0126] 7. Roll pin [0127] 8. Roll pin [0128] 9. Lateral mounting members of 1[0129] 10. Cardan shaft [0130] 11. Electric motors [0131] 12. Gearing [0132] 13. Equalization roll stand [0133] 14. Equalization rolls [0134] 15. Backing rolls [0135] 16. Winch [0136] 17. Winch [0137] 18. Winch [0138] 16a. Frame [0139] 17a. Frame [0140] 18.a Frame [0141] 16b. Coil [0142] 17b. Coil [0143] 18b. Coil [0144] 19. Drive [0145] 20. Rods [0146] 21. Guide rolls [0147] 22. Strip layer [0148] 23. Strip layer [0149] 24. Strip layer [0150] 25. Winding-up winch [0151] 26. Inlay strip [0152] 27. Winding-up winch [0153] 28. Strip to be produced [0154] 29. Winding-up winch [0155] 30. Inlay strip [0156] 31. First strip [0157] 32. Narrower strip [0158] 33. Narrower strip [0159] 34. Narrower strip [0160] 35. Narrower strip [0161] 36. Longitudinal edge [0162] 37. Longitudinal edge [0163] 38a. Boundary areas [0164] 38b. Boundary areas [0165] 38c. Boundary areas [0166] 39. Groove [0167] 40. Two-layer "second arrangement of strips" [0168] 41. Copper strip [0169] 42. Copper strip [0170] 43. Manganine strip [0171] 44. Copper strip [0172] 45. Copper strip [0173] 46. Manganine strip [0174] 47. Terminal lugs [0175] 48. Bridge [0176] 49. Connecting legs [0177] 50. Three-layer "second arrangement of strips" [0178] 51. Strip of a first material [0179] 52. Strip of a first material [0180] 53. Strip of a different material [0181] 54. Strip of a first material [0182] 55. Strip of a first material [0183] 56. Narrower strip [0184] 57. Narrower strip [0185] 58. Hollow space [0186] 59. Slot [0187] 60. "Second arrangement of strips" [0188] 61. Strip of the first material [0189] 62. Strip of a precious metal [0190] 63. Strip for a lost inlay [0191] 64. Strip of a first material [0192] 65. Strip for a lost inlay [0193] 66. Staggered-profile strip [0194] 67. Staggered-profile strip [0195] 68. [0196] 69. [0197] 70. Staggered-profile strip [0198] 71. Strip of a first material [0199] 72. Strip for a lost inlay [0200] 73. Strip of a first material [0201] 74. Strip for a lost inlay [0202] 75. Strip of a first material [0203] 76. Strip of a first material [0204] 77. Strip for a lost inlay [0205] 78. Strip of a first material [0206] 79. Strip for a lost inlay [0207] 80. Separating body, wedge [0208] 81. Cooling zone [0209] 82. Heating zone [0210] 83. Guide elements [0211] 84. [0212] 85. Guide rolls [0213] 86. Guide elements [0214] 87. Annular groove [0215] 88. Collar [0216] 89. Flanks of the annular groove [0217] 90. Heating means [0218] 91. DC power source [0219] 92. Line [0220] 93. Line [0221] A: Location of wedge-shaped separating body [0222] B: Location of wedge-shaped separating body [0223] R: Rolling direction

The invention claimed is:

1. Method for producing a strip the width of which is defined by the two longitudinal edges thereof, which is made of at least one first metallic or predominantly metallic material, and in which the region, across which the first material extends, is provided with a boundary area that extends in staggered manner between the two longitudinal edges over the cross-section of the strip, comprising the steps of
   (a) combining strips of different widths, which contain the first material and which as such do not comprise a staggered boundary area between their two longitudinal edges, only in a roll nip or before a roll nip to form a first arrangement of strips having a staggered boundary area;
   (b) complementing the first arrangement of strips by placing one or more additional strips in the first arrangement in a roll nip or before a roll nip to form a second arrangement of strips having a rectangular cross-section; and
   (c) bonding at least the strips of the first arrangement of strips to each other by rolling, wherein the material of one, more or all additional strips that complement the first arrangement of strips to form the second arrangement of strips is selected to ensure that it will form no or only a considerably weaker bond with the strips of the first arrangement by the rolling operation than the bond between strips of the first arrangement, and that theses additional strips, whose material is selected in the described way is removed from the second arrangement of the strips after the rolling process.

2. The method as defined in claim 1, wherein the steps (a) and (b) are carried out simultaneously.

3. The method as defined in claim 1, wherein two cylindrical working rolls are used for rolling, which define between them the roll nip, and that the different strips from which the second arrangement of strips is formed are united only in or shortly before the nip.

4. The method as defined in claim 1, wherein rolling is carried out as a cold-roll plating operation.

5. The method as defined in claim 1, wherein rolling is carried out as a hot-roll plating operation.

6. The method as defined in claim 4, wherein the strip is equalized by an additional rolling operation after the roll-plating process.

7. The method as defined in claim 6, wherein the strip is wound up only after the equalization process.

8. The method as defined in claim 6, wherein the strip is equalized between two equalizing rolls arranged downstream of the working rolls.

9. The method as defined in claim 1, wherein an intermediate layer, acting as intermediary in the bonding process, is arranged between the strips of the first arrangement of strips if and to the extent these cannot be bonded immediately by rolling.

10. The method as defined in claim 9, wherein a separate strip is introduced into the first arrangement of strips for forming the intermediate layer.

11. The method as defined in claim 9, wherein the intermediate layer is bonded onto one or more of the strips that form the first arrangement of strips, before they are united to form the first arrangement of strips.

12. The method as defined in claim 11, wherein the intermediate layer is galvanically separated onto one or more of the strips that form the first arrangement of strips.

13. The method as defined in claim 9, wherein the intermediate layer is selected to be thinner than the strips that are to be connected by it.

14. The method as defined in claim 9, wherein the intermediate layer is selected to be very much thinner than the strips that are to be connected by it.

15. The method as defined in claim 12, wherein the intermediate layer is applied by separation in a thickness of 10 μm maximally.

16. The method as defined in claim 12, wherein intermediate layer is applied by separation in a thickness of 5 μm maximally.

17. The method as defined in claim 1, wherein following the nip, the additional strips to be removed are pulled in a different direction than the composite strip to be produced, showing the stronger bond and contained the first arrangement of strips, and that the additional strips to be removed are removed in this way from the rolled second arrangement of strips.

18. The method as defined in claim 17, wherein at the point (A, B) where the additional strips to be removed separate from the composite strip showing the stronger bond, guide surfaces are provided between that composite strip and the one or more strips to be removed, which support the guiding effect that moves the strips in the respective direction of tension.

19. The method as defined in claim 18, wherein the guiding surfaces form one or more wedges.

20. The method as defined in claim 6, wherein the material of one, more or all additional strips that complement the first arrangement of strips to form the second arrangement of strips is selected to ensure that it will form no or only a considerably weaker bond with the strips of the first arrangement of strips by the rolling operation than the strips, and that these additional strips, whose material is selected in the described way, is removed from the second arrangement of strips after the rolling process, and
   wherein the equalizing process is carried out after at least one of the additional strips has been removed from the rolled second arrangement of strips.

21. The method as defined in claim 6, wherein the material of one, more or all additional strips that complement the first arrangement of strips to form the second arrangement of strips is selected to ensure that it will form no or only a considerably weaker bond with the strips of the first arrangement of strips by the rolling operation than the strips, and that these additional strips, whose material is selected in the described way, is removed from the second arrangement of strips after the rolling process, and
   wherein the equalizing process is carried out after all additional strips have been removed from the rolled second arrangement of strips.

22. The method as defined in claim 1, wherein the material of the one or of the additional strips is selected to be different from the first material and that all strips of the second arrangement of strips are bonded together by the rolling process.

23. The method as defined in claim 1, wherein the strips used are strips which, apart from a plated layer which is thin compared with the thickness of the respective strip and which is to produce the bond during the rolling process, consist of a single material in their entirety.

24. The method as defined in claim 23, wherein strips consisting of a homogenous material are used.

25. The method as defined in claim 1, wherein the strip is subjected to a heat-treatment after the rolling operation.

26. The method as defined in claim 1, wherein the first arrangement of strips comprises at least two strips arranged one beside and in parallel to each other so that their neighboring flanks are in contact with each other, that the material properties of the flanks to be connected are determined in such a way that the contacting flanks can be caused by heating to form a material bond,
and that the at least two strips are heated, at least in the area of their contacting flanks, to a temperature at which those flanks will then immediately form a material bond one with the other.

27. The method as defined in claim 26, wherein the second arrangement of strips is guided during the rolling operation so that its strips are prevented from moving to the side in the nip.

28. The method as defined in claim 26, wherein the material properties of the flanks to be bonded one to the other are selected to be different so that, when the contacting flanks are heated, an alloy will form whose melting point is lower than the melting point of the strips to be connected in pairs at their flanks.

29. The method as defined in claim 26, wherein at least one of the strips to be connected in pairs at their flanks has the respective flank coated with a solder.

30. The method as defined in claim 29, wherein at least one of the two strips is coated with the solder only on the respective flank.

31. The method as defined in claim 29, wherein the at least one strip is coated on its respective flank with a first metal, and the other strip is coated on its respective flank with a second metal and that as a result of the heating process these metals form the lower melting point alloy.

32. The method as defined in claim 29, wherein the respective flank is coated using a galvanic process.

33. The method as defined in claim 26, wherein the strips are pressed together by their flanks facing each other in the nip.

34. The method as defined in claim 1, wherein the rolling process is carried out using a reduction per pass of 50%.

35. The method as defined in claim 34, wherein the rolling process is carried out using a reduction per pass of 60% to 80%.

36. The method as defined in claim 25, wherein the strips and/or the first or the second arrangement of strips are heated up after rolling to the temperature at which the flanks will be connected by a material bond.

37. The method as defined in claim 36, wherein the first arrangement of strips is wound up continuously after rolling and is then heated.

38. The method as defined in claim 36, wherein the strips and/or the first or the second arrangement of strips are heated immediately after rolling.

39. The method as defined in claim 38, wherein the strips and/or the first or the second arrangement of strips are passed through a heating zone at the same speed at which they leave the nip.

40. The method as defined in claim 26, wherein the strips in the first or the second arrangement of strips are heated up before the rolling operation to the temperature at which their flanks will form a material bond between them.

41. The method as defined in claim 40, wherein the strips in the second arrangement of strips are heated immediately before rolling and are then rolled in hot condition.

42. The method as defined in claim 40, wherein the first and the second arrangement of strips are guided already in the zone where they are heated so that their strips will not move to the side.

43. Method in which one or more of the strips produced according to claim 1 are used once more in a method according to claim 1 for producing a more complex strip.

44. The method as defined in claim 5, wherein the strip is equalized by an additional rolling operation after the roll-plating process.

45. The method as defined in claim 44, wherein the strip is wound up only after the equalization process.

46. The method as defined in claim 44, wherein the strip is equalized between two equalizing rolls arranged downstream of the working rolls.

47. The method as defined in claim 1, wherein rolling is carried out as a hot-roll plating operation;
the strip is wound up only after the equalization process;
and the equalizing process is carried out after at least one of the additional strips has been removed from the rolled second arrangement of strips.

48. The method as defined in claim 1, wherein rolling is carried out as a hot-roll plating operation;
the strip is wound up only after the equalization process;
and the equalizing process is carried out after all additional strips have been removed from the rolled second arrangement of strips.

* * * * *